United States Patent [19]

Mai

[11] 4,147,267

[45] Apr. 3, 1979

[54] EQUIPMENT FOR LIFTING AND DEPOSITING CABINS, SHELTERS, REPLACEMENT CONSTRUCTIONS AND THE LIKE

[75] Inventor: Erich Mai, Collenberg, Fed. Rep. of Germany

[73] Assignee: Firma Josef Haamann, Fed. Rep. of Germany

[21] Appl. No.: 827,081

[22] Filed: Aug. 23, 1977

[51] Int. Cl.$^2$ .............................................. B60P 1/64
[52] U.S. Cl. ..................................... 414/498; 254/45
[58] Field of Search .................. 214/515, 38 R, 38 B, 214/38 BA, 38 BB, 38 C, 38 D, 350, 84; 254/45

[56] References Cited

U.S. PATENT DOCUMENTS

| 3,165,216 | 1/1965 | Macksoud et al. | 214/515 |
| 3,773,199 | 11/1973 | Arvidsson | 214/515 |

Primary Examiner—Albert J. Makay
Attorney, Agent, or Firm—Jacobi, Lilling & Siegel

[57] ABSTRACT

Lifting and depositing equipment for cabins, shelters or the like that are movable on the loading surfaces of trucks or similar vehicles, comprising a plurality of jacks detachably fastened by trusses to the side walls of the cabin. A detachable, laterally displaceable roller system and a guidance system are mounted on the trusses for at least two of the jacks that are mutually oppositely disposed in the transverse direction, whereby upon a truck moving beneath the cabin, the roller systems glide off the upper rims of the upright side walls of the truck and support the cabin so as to maintain a space between it, the truck loading surface and the side walls. The guide systems cooperate jointly with the side walls to ensure simultaneously a lateral aligning of the cabin with respect to the loading surface and side walls to effect a central positioning of the cabin on the loading surface of the truck.

4 Claims, 6 Drawing Figures

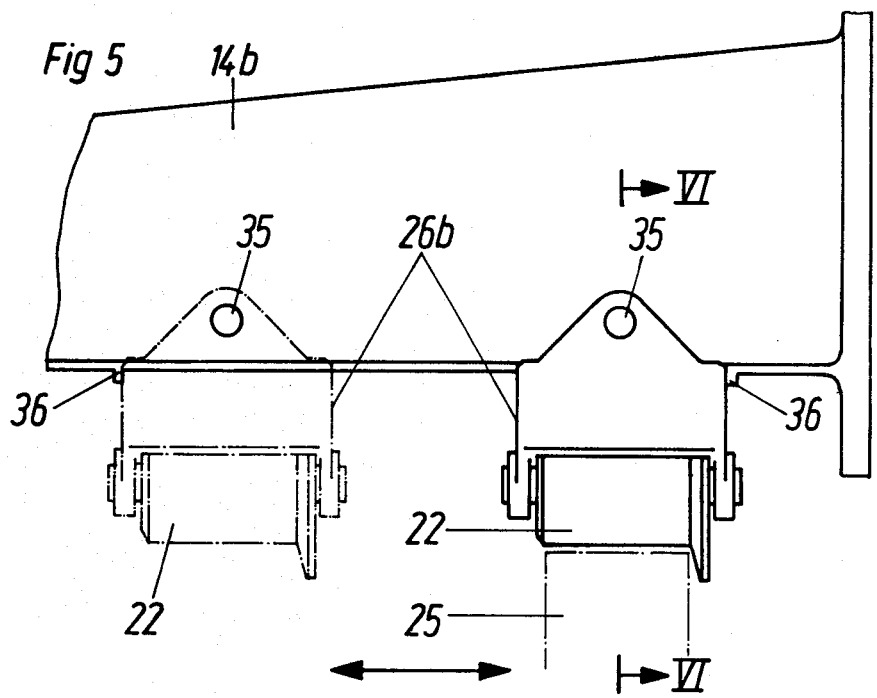
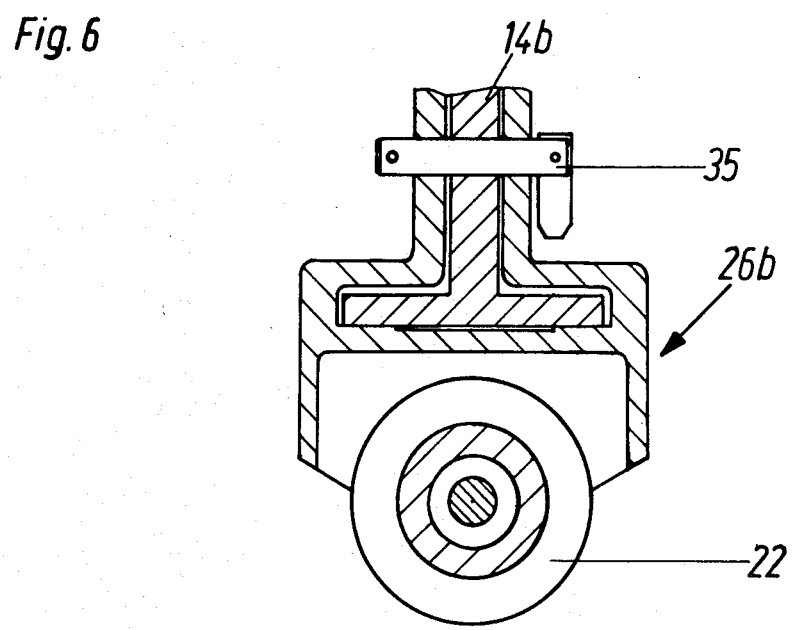

EQUIPMENT FOR LIFTING AND DEPOSITING CABINS, SHELTERS, REPLACEMENT CONSTRUCTIONS AND THE LIKE

BACKGROUND OF THE INVENTION

The invention relates to lifting and depositing equipment for cabins, shelters, replacement constructions and the like which may be moved on the loading surfaces of trucks and comprise several, preferably four, jacks detachably mounted at the side walls of the cabin or the like, in particular jacks for manual operation with an open housing to seat a support leg provided with teeth.

Such a lifting and depositing system is known from German Auslegeschrift No. 1,586,723, which was filed by the same applicant. In order to simplify both the construction and the dismantling and also the moving of the individual parts of this lifting and depositing system, the jacks designed for manual operation are always provided with an open housing to allow the insertion or removal of the support legs into or from the jack housings transversely to the direction of lifting. Such lifting and depositing equipment already has shown its worth in practice; however, known similar designs, for instance with conventional track jacks, make it difficult and time-consuming to move underneath a raised cabin or the like with a truck in such a manner that the cabin thereupon may be easily and properly deposited on the loading surface of the truck, in particular if the vehicle's side walls are fixed and if there is little play between the walls and those of the cabin (sometimes the play is only of the order of 12 mm).

SUMMARY OF THE INVENTION

Therefore, the invention addresses the problem of creating a lifting or depositing system for cabins, shelters, replacement constructions and the like, which essentially simplifies moving the loading surface of a truck underneath a raised cabin or the like and therefore allows a corresponding saving in labor. The lifting and depositing equipment of the invention to that end is designed to operate jointly with trucks of fixed or rigid sides and capable of supporting appreciable vertical loads, for instance consisting of metal chassis'.

The invention solves the above problem by providing one detachable, lateral, pivoting or displaceable roller system and one guidance system at each of the trusses of at least two jacks opposite each other with respect to the transverse direction, furthermore providing a guidance system at these jacks so that when the truck moves underneath a cabin or the like, the roller systems glide off the upright sidewalls of the truck and support the cabin or the like so as to provide a spacing between the loading surface and the side walls, the guidance system operating jointly with the side walls simultaneously causing a lateral aligning of the cabin or the like with respect to the side walls and the loading surface, so that thereupon a central deposition of the cabin or the like is possible on the truck's loading surface. As a rule it is enough to equip two transversely opposite jacks of the four conventionally present at the sides of the cabin or the like with the rollers and guide system of the invention; the truck then moving underneath the cabin or the like from the direction of these two jacks. Minor errors in aligning between cabin and truck are compensated for by the guidance systems in this process, which center the cabin or the like with respect to the vehicle's loading surface. While the rollers glide off the side walls of the truck, the support legs of the associated jacks to some extent are load-relieved because the other support legs of the remaining jacks carry not only the weight of the cabin or the like, but also absorb the thrusts that occur when the vehicle moves underneath the cabin. When the vehicle is all the way underneath the cabin or the like, all the jacks are actuated simultaneously in order to raise the cabin or the like enough to remove the roller assemblies, or to swing them laterally out of the way or displace them to permit subsequent lowering of the cabin or the like on the truck's loading surface. The jacks thereupon may be taken off, dismantled and be placed in a position for shipping. It is noted that the invention applies to different jack designs and therefore is not restricted to the embodiment illustrated below.

An embodiment of the invention of very simple design is characterized in that each roller and guidance system is provided with one roller with at least one guidance shoulder at the end face of the roller, and in that every guidance shoulder operates jointly for instance with the inside of the truck's side wall.

Further simplification is achieved by providing each roller and guidance system with one roller with at lest one guidance shoulder at the end face of the roller and by supporting the latter in a detachable, laterally pivoting or displaceable bearing that may be fastened to the beam in the operating or storage positions by means of one or more linch pins.

If every truss is provided with equipment for detachable fastening of the removable bearing into a storage position, the bearings may be advantageously connected to prevent losing them with their associated trusses in such a manner that they may be ready again for use for the following operational procedure.

The invention is explained further below using the drawings of the embodiments.

BRIEF DESCRIPTION OF THE DRAWINGS

FIGS. 4 through 6 are partial elevational views showing variations of the roller bearing which can be swung out and displaced.

DESCRIPTION OF THE PREFERRED EMBODIMENTS

Figure 1:
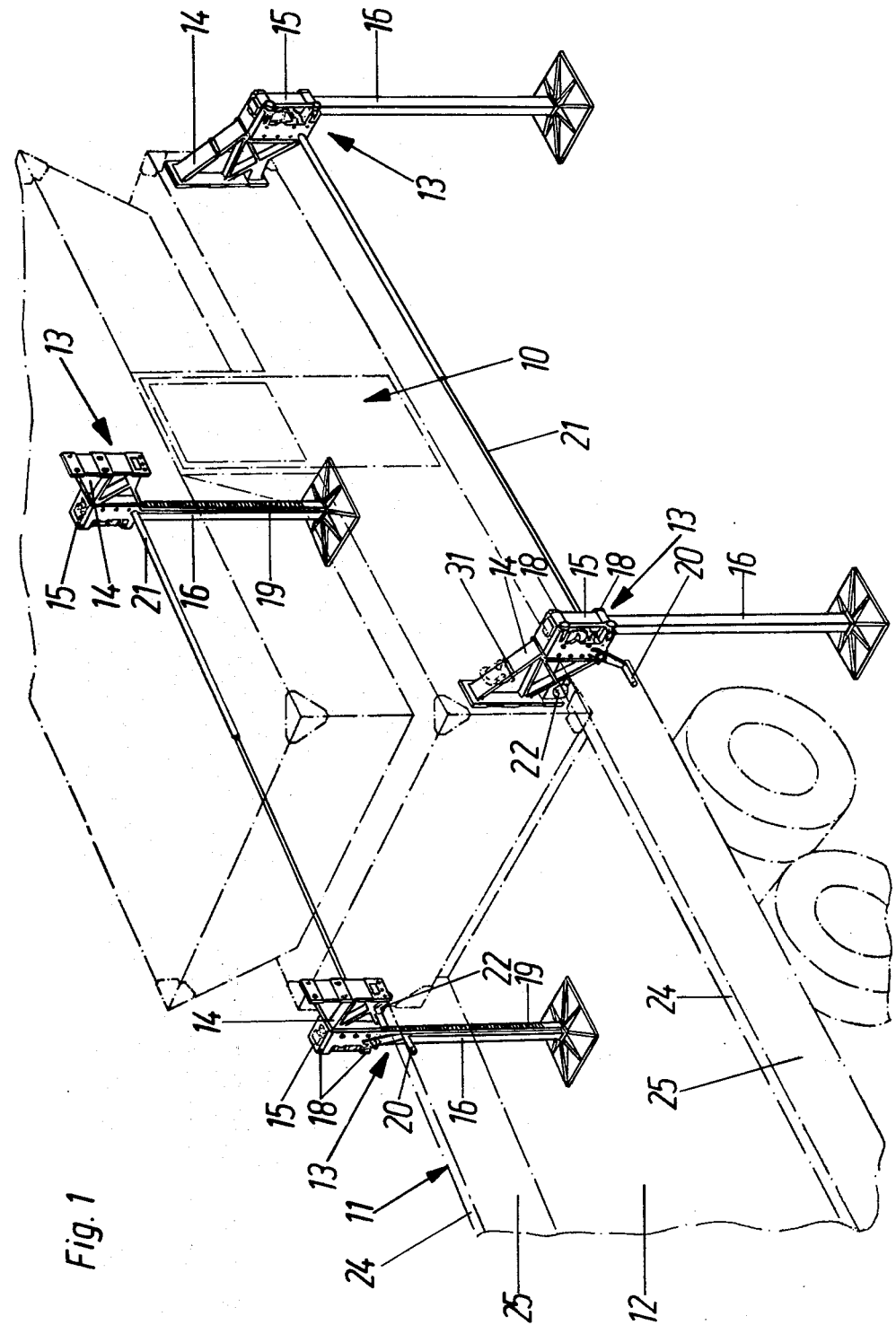
FIG. 1 is a partial perspective view of a cabin resting on a lifting and depositing system when the truck begins to move underneath it.
Figure 2:
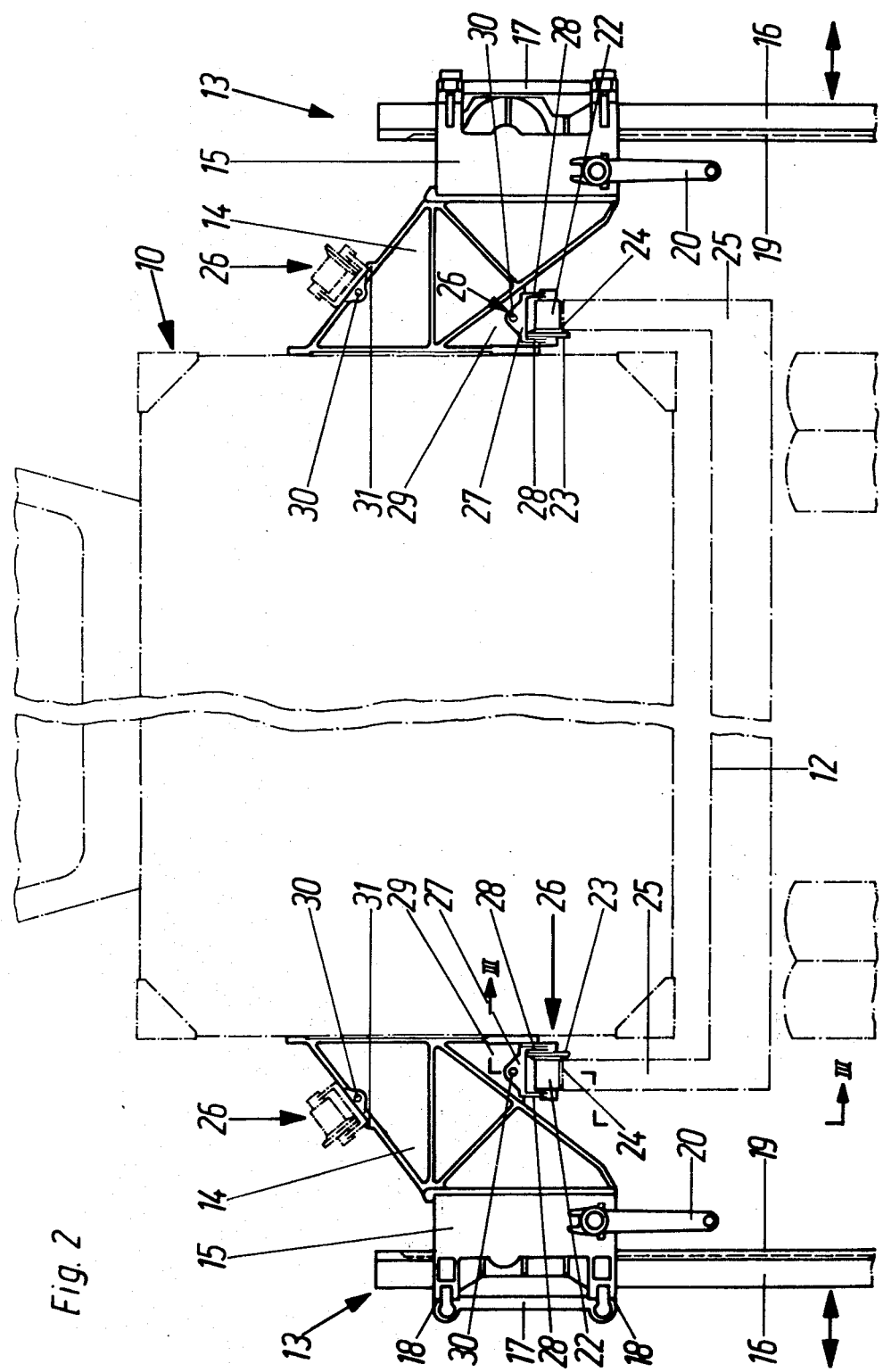
FIG. 2 is a front view of the cabin shown in FIG. 1 and of part of the lifting and depositing equipment which faces the truck.

FIG. 1 shows a cabin 10 lifted by means of a lifting and depositing system so that it allows the truck 11 to move in underneath it. The cabin is to be deposited on the loading surface 12 of said truck for the purpose of being moved. The lifting and depositing system in particular comprises four jacks 13 of which trusses 14 are detachably fastened by bolts 150 to the side walls of cabin 10 near its corners. Each truss 14 is securely mounted to a jack housing 15 and each jack housing may be of folding design so that when open, it permits inserting or removing bearing legs 16 of the jacks into or from the housing transversely to the direction of lifting. Jack housings 15 are provided for that purpose with a cover 17 at their external narrow sides, which can be folded up or down by means of a hinge 18 (FIG. 2).

Each of the bearing legs 16 is provided with teeth 19 operating jointly with a gear (omitted) in the housing 15 of the jack. First, the four jacks 13 are individually actuated by handcranks 20 for the deposition of cabin 10 onto the loading surface 12, so that cabin 10 may be brought into horizontal position. Then the gears of jacks 13 are hooked up by means of connecting shafts 21 mounted between jacks 13 opposite the longitudinal sides of cabin 10. Cabin 10 then is lifted further by simultaneously actuating the handcranks 20 of, for instance, the two jacks 13 facing the truck.

Figure 3:
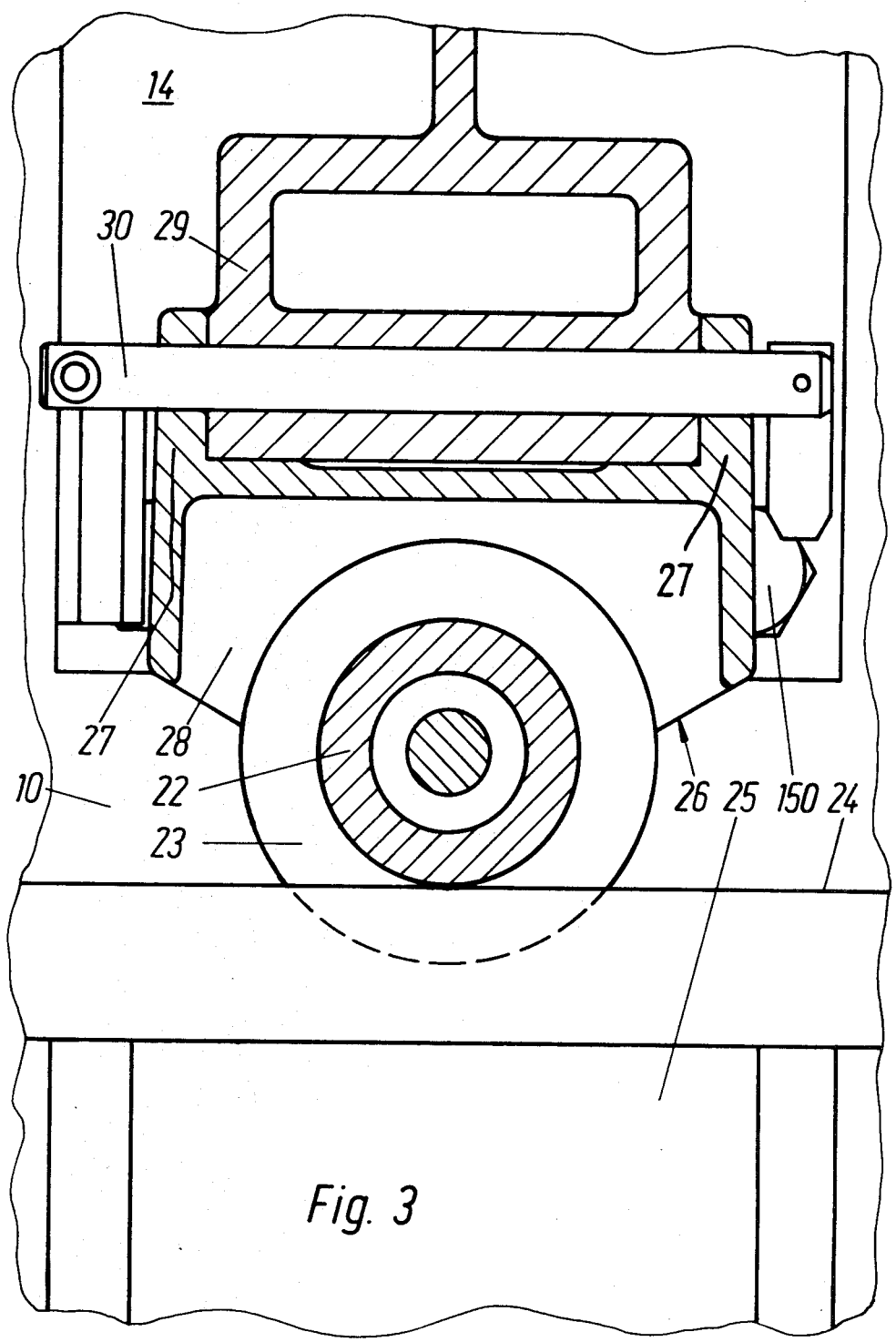
FIG. 3 is a partial sectional view taken along line 111—111 of FIG. 2.

In order to facilitate moving the truck underneath the cabin 10, each of trusses 14 of the jacks 13 adjacent to the truck is provided with one roller 22 provided in turn with a guide shoulder 23 at its inside end face. Cabin 10 is lifted enough and then lowered slightly by jacks 13 when the truck moves underneath it so these rollers 22 can rest on and roll off the upper rims 24 of the upright, rigidly fixed sidewalls 25 of truck 11, while simultaneously guidance shoulders 23 function jointly with the insides of the sidewalls and align cabin 10 — which is held spaced from the loading surface 12 and from side walls 25 — laterally with respect to this loading surface and the side walls. Once the truck has moved completely underneath cabin 10, the latter is raised again slightly by means of jacks 13 in order to remove rollers 22. Thereupon cabin 10 may be lowered onto loading surface 12. Upon deposition of the cabin on the loading surface, trusses 14 are removed by detaching bolts 150 (see FIG. 3) and the jacks 13 are dismantled and brought into their storage position. It is noted that the rollers are not required when lifting cabin 10 from the loading surface 12 and depositing it for instance on the ground.

Each roller 22 is supported in a box-like bearing 26 (FIG. 3), which may be made to engage in lock-forming manner a correspondingly shaped bar 29 of truss 14 by means of two upright brackets 27 and two sidewalls 28. Flush boreholes for seating linch pins 30 are provided in brackets 27 and bar 29 for securing bearing 26 in its operational position shown particularly clearly for instance in FIGS. 2 and 3.

When, as explained above, there is no further need for rollers 22, linch pins 30 are removed, whereby bearing 26 inclusive of roller 22 may be removed from truss 14.

Each truss 14 may be provided with equipment for seating the bearing 26 in a storage position. To that end, trusses 14 shown in the embodiment of FIGS. 1 and 2 are provided with a holding rib 31 and with a borehole (omitted) in the side, the latter permitting insertion of linch pin 30, one of the sidewalls 28 of bearing 26 coming to rest against holding rib 31. FIG. 2 shows in broken lines the bearings 26 in their storage position. The last discussed steps for storing bearings 26 are explained only in an illustrative manner. Other systems may also be provided in lieu of detachable bearings, allowing pivoting outward or displacing of the rollers, when these are no longer needed, along the truss, as shown in FIG. 4 or FIGS. 5 and 6.

Figure 4:
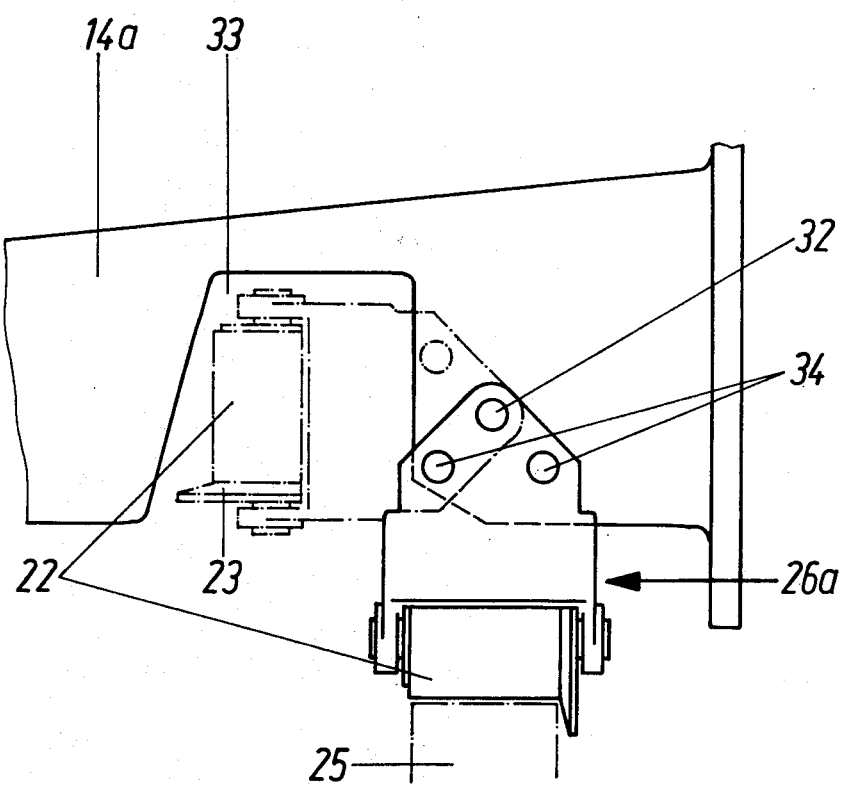

As regards the embodiment shown in FIG. 4, bearing 26a supporting roller 22 is pivotably supported between the operational position shown in solid lines and the storage position shown in broken lines by means of a bolt 32 in beam 14a. Truss 14a is provided with a corresponding recess 33 to that end. Bearing 26a may be stopped or locked in both positions by means of linch pin 34.

FIGS. 5 and 6 show a further embodiment, FIG. 6 being a partial section along line VI—VI of FIG. 5. In this case bearing 26b for roller 22 rests laterally displaceable on the flangelike lower rim of truss 14b and is held by means of a linch pin 35 either in the operational position shown in solid lines or in the storage position shown in broken lines. Stops 36 may be mounted on or formed against truss 14b for the purpose of facilitating the setting of bearing 26b into either the operational or the storage position.

What is claimed is:

1. In lifting and depositing equipment for a shelter or the like having sidewalls and being movable on the loading surface of a truck or similar vehicle with upright sidewalls having upper rims, said equipment comprising a plurality of jacks and trusses for detachably fastening said jacks to the sidewalls of the shelter, the improvement comprising:
a detachable, laterally displaceable roller system (22) and a guidance system (23) mounted on the trusses (14) of at least two jacks (13) that are mutually oppositely disposed with respect to the transverse direction, the roller system being positioned to engage the upper rims (24) of the upright sidewalls (25) of the truck and support the shelter when the truck is moved beneath the shelter so as to provide a space between the shelter and the loading surface (12) and the sidewalls (25), and the guidance system (23) being positioned to engage the sidewalls (25) to laterally align the shelter (10) with respect to said sidewalls (25) and loading surface (12) in order to permit a central deposition of shelter (10) on the loading surface (12) of truck (11).

2. Lifting and depositing equipment as defined in claim 1, characterized in that each roller and guidance system is provided with a roller (22) having end faces and comprising at least one guidance shoulder (23) at one end of said roller, and in that each guidance shoulder cooperates with the inside of the sidewall (25).

3. Lifting and depositing equipment as defined in claim 1, characterized in that each roller and guidance system comprises a roller (22) having end faces and comprising at least one guidance shoulder (23) at one end face of said roller, a detachable, laterally displaceable bearing (26, 26a, 26b) supporting said roller (22), each truss (14) having operating and storage positions, and one or more linch pins (30, 34, 35) for connecting said bearing to a truss (14) in its 4. Lifting and depositing equipment as defined in claim 3, characterized in that each truss (14) is equipped with a device for removably fastening the detachable bearing (26) in the storage position.

* * * * *